T. W. DEMAREST.
VALVE.
APPLICATION FILED JULY 22, 1908.
921,209.
Patented May 11, 1909.
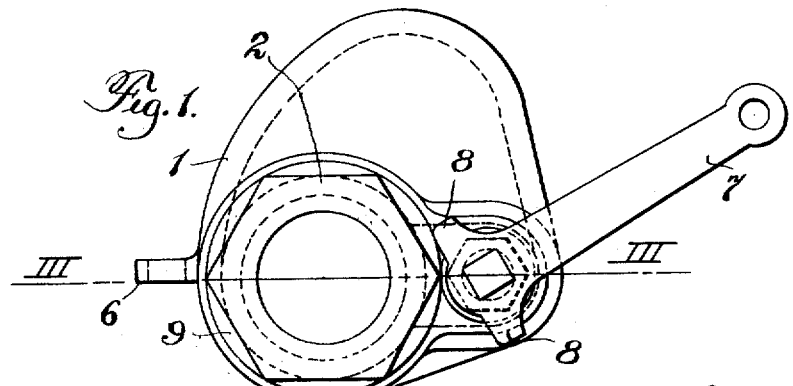
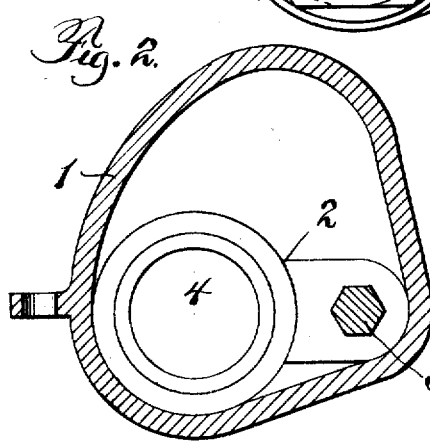
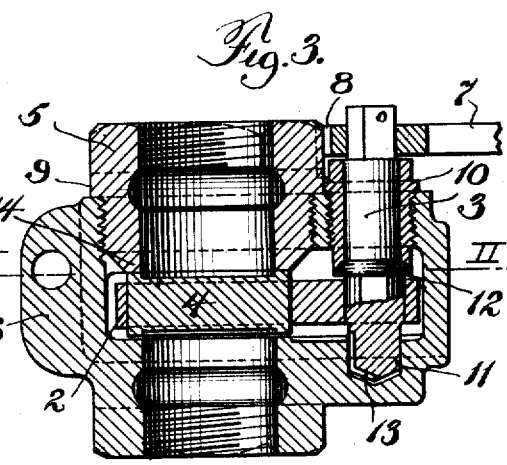
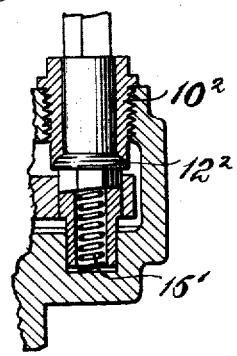
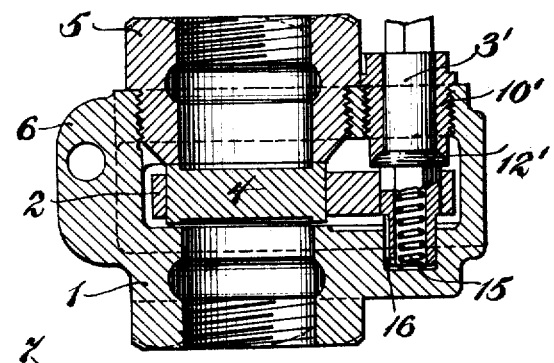
WITNESSES
Harvey L. Lechner
J. C. Bradley
INVENTOR
Thomas W. Demarest
by atty
Paul Synnestvedt

UNITED STATES PATENT OFFICE.

THOMAS W. DEMAREST, OF FORT WAYNE, INDIANA.

VALVE.

No. 921,209.

Specification of Letters Patent.  Patented May 11, 1909.

Application filed July 22, 1908. Serial No. 444,762.

*To all whom it may concern:*

Be it known that I, THOMAS W. DEMAREST, a citizen of the United States, residing at Fort Wayne, in the county of Allen and State of Indiana, have invented certain new and useful Improvements in Valves, of which the following is a specification.

The invention relates to valves and particularly straight way valves of the swinging or oscillating gate type. The invention has for its principal objects, the simplification of the structure of valves of this character; the provision of a valve wherein the removable cap commonly employed in valves of this type is done away with and the whole body made in one integral casting; the provision of a seat for the valve which is readily removable for renewal and to give access to the valve disk, and which also serves as a pipe connection; the provision of improved stop means for limiting the movement of the valve without imposing strain on parts susceptible of injury; and the provision of an improved operating pin constructed to make tight contact with its bushing and at the same time be rigidly supported at its inner end. Certain embodiments of the invention are illustrated in the accompanying drawings, wherein Figure 1 is a plan view of the valve, Figure 2 is a transverse section on the line II—II of Figure 3, Figure 3 is a longitudinal section on the line III—III of Figure 1, Figure 4 is a longitudinal section corresponding to that of Figure 3, but of a slightly modified construction, Figure 5 is a partial sectional view showing a modified form of operating pin, and Figure 6 is a detail section through the end of the operating lever.

Referring to the drawings, 1 is the valve body preferably made in the form of an integral casting as shown, 2 is the valve carrier secured to the operating pin 3, 4 is the valve disk which is removably seated in the ring at the end of the carrier 2, 5 is a coupling member screw threaded into the passage through the valve body, 6 is the supporting lug integral with the body portion and adapted to be secured to a bracket and so remove the strain of supporting the valve from the pipe connections, and 7 is the operating handle fitted on to the squared end of the operating pin and provided with a pair of downwardly projecting lugs 8—8 adapted to take against a ring 9 on the coupling 5 when the valve is in its extreme positions. The provision of this stop means prevents the imposition of undue strain on parts of the valve susceptible of injury.

The operating pin 3 is supported at its upper end in a bushing 10 of relatively soft metal screw threaded into the valve body, and at its lower end is journaled in a recess 11 in the valve body. The pin has an angular portion intermediate its two bearings, and the valve carrier 2 is mounted upon this angular portion. The pin is also provided with a rounded thrust shoulder 12 adapted to take against a correspondingly shaped seat on the bushing 10. Tight engagement between the shoulder 12 and its seat is secured by providing the lower end of the pin with the groove 13 whereby the pressure in the valve body is permitted to act upon the end of the pin and thus thrust it endwise. By this arrangement an effective support of the valve carrier and valve disk is secured by reason of the two point bearing of the pin 3, and a tight fit is at the same time obtained between the shoulder 12 and its seat.

The coupling member 5 is preferably made of such diameter at its lower screw threaded end, that when removed, enough space is provided for the removal of the valve disk 4, and also of the carrier 2, so that the operating parts may be removed and refitted very easily, and without removing the valve body from the position in which it is secured. The lower end 14 of the member 5 is ground to constitute a seat for the disk 4, so that all of the wearing parts are easily accessible for renewal, or re-grinding.

In Figure 4 a somewhat different arrangement of operating pin 3' is shown, which pin is recessed at its lower end to receive a spring 15, which spring 15 assists in forcing the shoulder 12' against its seat in the bushing 10'. A groove 16 is provided for admitting pressure to the recess in which the spring is mounted, and so augmenting the longitudinal pressure upon the pin. In other respects the valve construction is precisely the same as illustrated in Figure 3.

In Figure 5 a further modification of the operating pin is illustrated, the distinction over the construction of Figure 4 being that no groove is provided for admitting pressure to the recess carrying the spring 15². In this construction the spring alone is depended upon to secure a tight joint between the collar 12² and its seat in the bushing 10². In other respects the valve construction is the same as heretofore described and illustrated in Figures 1, 2 and 3.

Having thus described my invention and illustrated its use, what I claim as new and desire to secure by Letters Patent is the following:—

1. A valve comprising a body portion provided with a transverse passage, a disk, a carrier therefor mounted to swing transversely across the passage, and a coupling member threaded into one end of the passage, the arrangement of the parts and the diameter of the coupling being such as to permit the removal of the valve disk and the carrier together when the coupling member is removed.

2. A valve comprising a body portion provided with a transverse passage, a disk mounted to swing transversely across the passage, and a coupling member threaded into one end of the passage and provided with a wrench engaging portion and a circular exterior portion, an operating handle for swinging the disk and stop means on the handle for engaging the circular portion when the valve reaches extreme position.

3. A valve comprising a body portion provided with a transverse passage, an annular disk carrier mounted to swing transversely across the the passage, a disk slidably mounted in the carrier, and a coupling member threaded into one end of the passage, the arrangement of the parts and the diameter of the coupling being such as to permit the removal of the disk and the annular carrier when the coupling member is removed.

4. In combination, a body portion having a pin-receiving socket, a valve therein, an operating pin for the valve provided with a thrust bearing at its upper portion and journaled at its lower end in the receiving socket with such end extending down to the end of the socket, and a passage leading from the pressure side of the valve to the end of the pin in the socket for securing tight engagement at the thrust bearing.

In testimony whereof I have hereunto signed my name in the presence of the two subscribed witnesses.

T. W. DEMAREST.

Witnesses:
  W. L. WILT,
  H. C. RIPPE.